May 4, 1948. A. D. ROBBINS 2,440,975
POWER DIVIDING DEVICE
Filed June 1, 1944
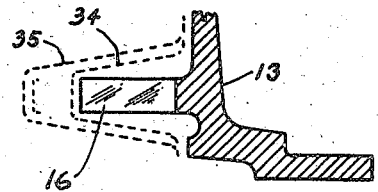
FIG. 3
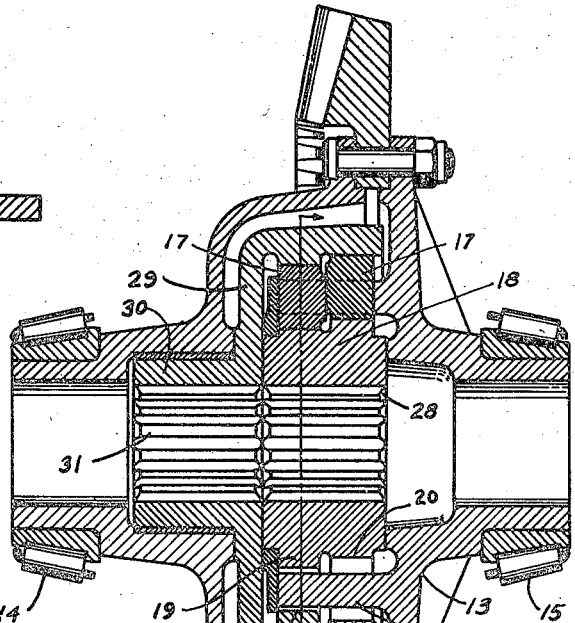
FIG. 1
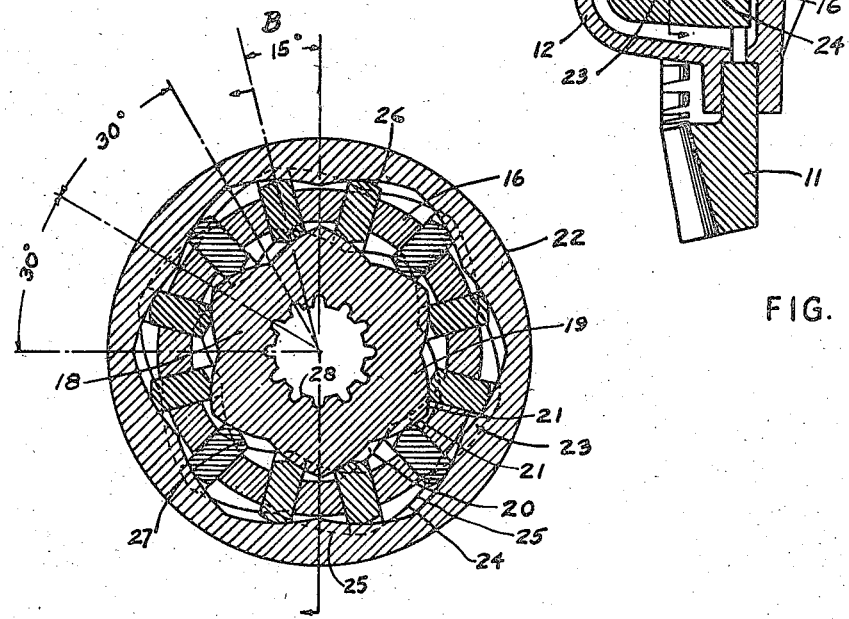
FIG. 4
FIG. 2
INVENTOR.
Azor D Robbins
BY Patented May 4, 1948

2,440,975

UNITED STATES PATENT OFFICE 2,440,975

POWER DIVIDING DEVICE

Azor D. Robbins, Glen Cove, N. Y.

Application June 1, 1944, Serial No. 538,301

8 Claims. (Cl. 74—389.5)

This invention relates to power dividing devices, or differentials, as used in the driving axles of automobiles for equalizing or dividing the power applied to the driving wheels.

One of the objects of this invention is to provide a power dividing device which will prevent either wheel from spinning when the tractive value at one of the wheels is poor, as when in snow or mud. Another object is to provide a device of this character which will be inexpensive in cost while maintaining a durable and reliable construction.

Other objects of the invention will appear as it is described in greater detail in connection with the accompanying drawings, wherein:

Fig. 1 shows a section through an axle driving gear including the preferred form of my device. Fig. 2 shows a section through the driving cage and driven cams which comprise the driving and driven members respectively. Fig. 3 shows a fragmentary section of the driving cage. Fig. 4 shows a detail of a driving plunger.

Referring to Fig. 1, the driving bevel gear 11 is mounted on a housing which comprises two halves 12 and 13. Each of the members 12 and 13 are journaled in antifriction bearings 14 and 15 which may be supported in the usual axle housing not shown. The housing member 13 carries axially projecting arms 16 which form an annular driving cage. In the spaces between the arms 16 are mounted pairs of plungers 17. The plungers 17 are of rectangular section and fit closely between the projecting arms 16 but with sufficient clearance to permit said plungers to slide freely in a radial direction.

Within the projecting arms 16 is a driven member 18 comprising a cluster of externally faced cams 19 and 20. In the preferred form shown, the cams are in two planes or series, one of the planes comprising six cams 19 and the other comprising six cams 20. Each cam 19 or 20 is formed with opposed spiral surfaces 21. Said surfaces are preferably in the form of an archemedian spiral and each surface extends circumferentially 30° around the center to meet an opposed surface. The series of cams in one plane are offset 15° in relation to the other series as shown at B, in Fig. 2.

Enclosing the projecting arms 16 is another driven member 22 comprising a cluster of internally faced cams 23 and 24. The cams of this member are also in two groups one of each group being in the same plane as the external cams of driven member 18. The internal cams 23 and 24 have spiral surfaces 25 which form cams equal in radial height to cams 19 and 20.

The plungers 17 have arcuate surfaces 26 at their outer ends adapted to slide on the surfaces of cams 23 and 24. The inner ends of said plungers have surfaces 27 adapted to slide against the surfaces 21 of cams 19 and 20. The length of the plungers 17 is such that they fit closely, but movably, between said outer and inner cams.

The driven member 18 has a splined opening 28 to receive the usual axle shaft (not shown). The driven member 22 is formed with a web 29 and a hub 30. The hub 30 also has a splined opening 31 to receive an axle shaft.

It will be seen that the whole assembly, as shown, can rotate on the bearings 14 and 15, and that power applied to the gear 11 will carry the plungers 17 against the cams, normally driving both driven members at the same speed as the gear and housing. If, however, one cam member is held stationary, and the housing rotated, the plungers will move in and out over the stationary cams, forcing the other cam member to turn in the same direction but at twice the speed of the housing. Due to friction, however, a larger percentage of the driving force will be applied to the stationary cam and a smaller percentage to the moving cam. Therefore, unless there is considerable difference between the tractive resistance at the wheels of the vehicle, both cams will turn together and at the same speed.

The angles of the cam surfaces may be made, if desired, to give a complete locking action so that one cam could not be driven faster than the other by the outward or inward thrust of the driving plungers. In this case the cams will always turn at the same rate of speed unless one is turned forward by additional force such as by the faster turning wheel of the vehicle when turning a corner.

Prior to this invention power dividing devices have been made with two rows of plungers and with inner and outer cams. In such prior constructions two rows of plungers engage a wide common outer cam and the inner cam has two rows of cams offset 30° in angular relation to each other.

It is necessary in such a device to angularly offset the rows of plungers 15°, in their angular relationship, in order to obtain continuous action of the cams. To offset the plungers 15° and provide a strong mounting for them has been difficult and necessitated much wider cam structure because of the need for axial separation of the rows of plungers. It has also been difficult to provide a cage with rectangular holes for the plungers, due to this staggered position of holes in the cage. In the present invention, by offsetting the cams of both driven members 15°, it is possible to fit both rows of plungers in axially aligned pairs, close together, in a single easily milled slot, between the arms 16 and obtain overlapping action of the cams, in which, when one series of plungers are at the end of their stroke, the other series of plungers are midway on the faces of one series of cams.

In the construction shown herein the axial length of the driven members 18 and 22 and the driving cage 16 are greatly reduced as compared to equivalent members in prior constructions. Since reduction in width of the present device is an important object of the invention, Fig. 3 has been added to show a profile of a projecting arm 16 from the housing 13 and dotted outline 34 shows the usual added steel to form a forgable part, from which to machine the piece. The dotted outline 35 shows a comparable outline of the forging in prior constructions.

In addition to a narrower construction of cage 16, the driven members 18 and 22 and housing member 12 are also made narrower as the result of this improved construction.

One of the advantages of this narrower construction is a saving in the cost of construction by using less weight of valuable steel; by saving forging cost and by having less steel to cut away in machining the above named pieces.

While the invention has been described specifically in connection with the drawings above referred to, it is not to be limited save as defined by the appended claims.

I claim as my invention:

1. A power dividing device comprising an annular driving cage, an annular driven member encompassing said driving cage and having a series of internal cams arranged in two planes the cams in one plane being angularly offset in relation to cams in the other plane, a second driven member within said cage and having a series of external cams arranged in two planes and positioned in the planes of the first named cams and angularly offset in relation to each other and plungers carried by said cage to operatively engage said cams.

2. A power dividing device comprising an annular driving cage, an annular driven member encompassing said driving cage and having a series of internal cams arranged in two planes the cams in each plane being spaced at uniform angular divisions and said cams in one plane being angularly offset in relation to the cams in the other plane, a second driven member within said cage and having a series of external cams arranged in two planes the cams in each plane being spaced at uniform angular divisions and said cams in one plane being angularly offset in relation to the cams in the other plane and plungers carried by said cage in each said plane to operatively engage said cams.

3. A power dividing device comprising an annular driving cage, an annular driven member encompassing said cage and having a series of internal cams arranged in two planes, a second driven member within said cage and having a series of external cams arranged in two planes, said cage having a plurality of slots and a pair of plungers in each of said slots adapted to operatively engage both external and internal cams.

4. A power dividing device comprising an annular driving cage, an annular driven member encompassing said driving cage and having a series of internal cams arranged in two planes the cams in each plane being spaced at uniform angular divisions and said cams in one plane being angularly offset in relation to the cams in the other plane, a second driven member within said cage and having a series of external cams arranged in two planes the cams in one plane being spaced at uniform angular divisions and said cams in one plane being angularly offset in relation to the cams in the other plane, said driving cage having a plurality of slots therein and pairs of plungers operating in each of said slots to engage both external and internal cams.

5. A power dividing device comprising an annular driving cage, an annular driven member encompassing said driving cage and having a series of internal cams arranged in the two planes the cams in each plane being spaced at uniform angular divisions and the cams in one plane being offset one fourth of the angular division between the cams in either plane, a second driven member within said cage and having a series of external cams arranged in two planes the cams in each plane being spaced at uniform angular divisions and the cams in one plane being offset one fourth of the angular division between the cams in either plane and plungers carried by said cage in each said plane to operatively engage said internal and external cams.

6. A power dividing device comprising an annular driving cage, an annular driven member encompassing said driving cage and having a series of internal cams arranged in two planes the cams in each plane being spaced at uniform angular divisions and the cams in one plane being offset one fourth of the angular division between the cams in either plane, a second driven member within said cage and having a series of external cams arranged in two planes the cams in each plane being spaced at uniform angular divisions and the cams in one plane being offset one fourth of the angular division between the cams in either plane said cage having openings therein equally spaced at one half of the angular divisions of said cams in any of said planes and plungers in axially aligned pairs in said openings adapted to engage said outer and inner cams.

7. A power dividing device comprising a driving cage, an annular driven member external to said driving cage and having internal cams arranged in a plurality of planes comprising six equally divided cams in each plane and the cams in one plane offset 15° in relation to the cams in the other plane, a second driven member within said cage having external cams arranged in a plurality of planes comprising six equally spaced cams in each plane and the cams in one plane offset 15° in relation to the cams in the other plane, said cage having twelve equally spaced openings therein and plungers in each of said openings adapted to engage said outer and inner cams.

8. A power dividing device comprising an annular rotative driving cage, an annular driven member encompassing said driving cage and having a series of internal cams arranged in a plurality of planes, the cams in each plane being angularly offset in relation to the others, a second driven member within said cage and having a series of external cams arranged in a plurality of planes coincident with the planes of said internal cams, said internal cams being angularly offset in relation to each other and plungers carried by said cage to operatively engage said cams.

AZOR D. ROBBINS.

(References on following page)

REFERENCES CITED

The following references are of record in the file of this patent:

UNITED STATES PATENTS

| Number | Name | Date |
|---|---|---|
| 1,336,950 | Ford | Apr. 13, 1920 |
| 1,689,285 | Knab | Oct. 31, 1928 |
| 1,836,684 | Robbins | Dec. 15, 1931 |
| 1,857,978 | Robbins | May 10, 1932 |

FOREIGN PATENTS

| Number | Country | Date |
|---|---|---|
| 156,667 | Switzerland | Aug. 15, 1932 |
| 474,560 | Great Britain | Nov. 3, 1937 |